United States Patent [19]

Craven

[11] 4,324,514
[45] Apr. 13, 1982

[54] ROUTER GUIDE APPARATUS FOR CUTTING PRINTING PLATES

[76] Inventor: Mark Craven, 6691 Melbourne Dr., Huntington Beach, Calif. 92646

[21] Appl. No.: 135,857

[22] Filed: Mar. 31, 1980

Related U.S. Application Data

[63] Continuation-in-part of Ser. No. 16,361, Mar. 1, 1979, abandoned.

[51] Int. Cl.³ .............................................. B23C 1/20
[52] U.S. Cl. .................................. 409/179; 33/23 K; 33/32 B; 409/178; 409/180
[58] Field of Search ............... 409/175, 178, 180, 181, 409/182, 79, 222, 179; 33/23 K, 32 B, 32 C, 27 C, 32 R; 30/310; 83/879

[56] References Cited

U.S. PATENT DOCUMENTS

| | | | |
|---|---|---|---|
| 881,899 | 3/1908 | Chapman | 33/27 K |
| 1,704,473 | 3/1929 | Greene | 33/23 K |
| 2,233,847 | 3/1941 | Philippe | 33/32 C |
| 2,261,644 | 11/1941 | Cockrell | 33/23 K |
| 2,578,371 | 12/1951 | Plester | 409/182 |
| 2,589,554 | 3/1952 | Killian | 409/222 |
| 2,625,860 | 1/1953 | Plester | 409/181 |
| 2,728,988 | 1/1956 | Young | 33/23 K |
| 3,178,826 | 4/1965 | Aisen | 33/32 B |
| 3,180,380 | 4/1965 | Franzen | 30/310 |
| 3,228,268 | 1/1966 | Strout | 409/175 X |
| 3,286,351 | 11/1966 | McAlister | 33/32 B |
| 3,421,411 | 1/1969 | Lowri et al. | 409/180 |
| 3,479,743 | 11/1969 | Zemberry | 409/175 X |
| 3,716,085 | 2/1973 | Wing | 409/79 X |
| 3,858,630 | 1/1975 | Cherry et al. | 409/79 X |
| 4,031,931 | 6/1977 | Balcombe | 409/175 X |
| 4,132,254 | 1/1979 | Shockovsky | 409/182 X |

*Primary Examiner*—William R. Briggs
*Attorney, Agent, or Firm*—Lawrence Fleming

[57] ABSTRACT

Apparatus for guiding a small router head along either straight paths or arcs of circles, for cutting sheet metal printing plates to desired outlines. The operator may guide the router over the same path several times, successively increasing the depth of cut until it is cut through. In the preferred form for cutting along straight lines, a guide rod is supported between two offset heads that attach to the work by suction cups. A short square-section mounting bar rides in a ball bushing along the guide rod. A router head assembly clamps detachably to the bar. For cutting arcs of circles a pair of radius rods is carried adjustably in a rotatable center head that attaches to the workpiece with a suction cup. A second mounting bar connects the free ends of the radius rods; the same router assembly may be detached and clamped to this bar.

7 Claims, 13 Drawing Figures

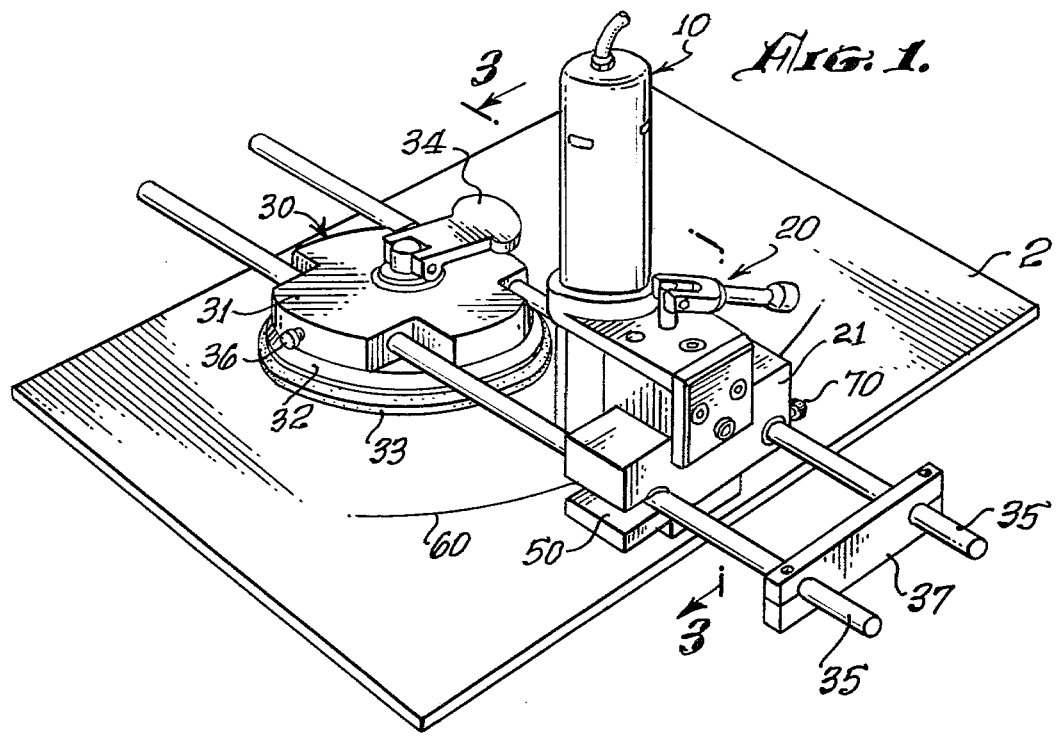
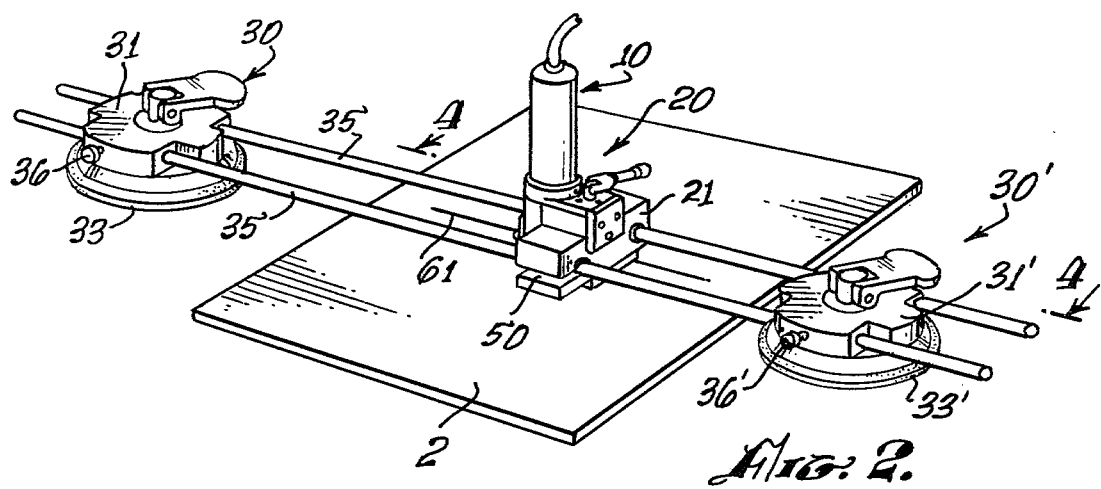

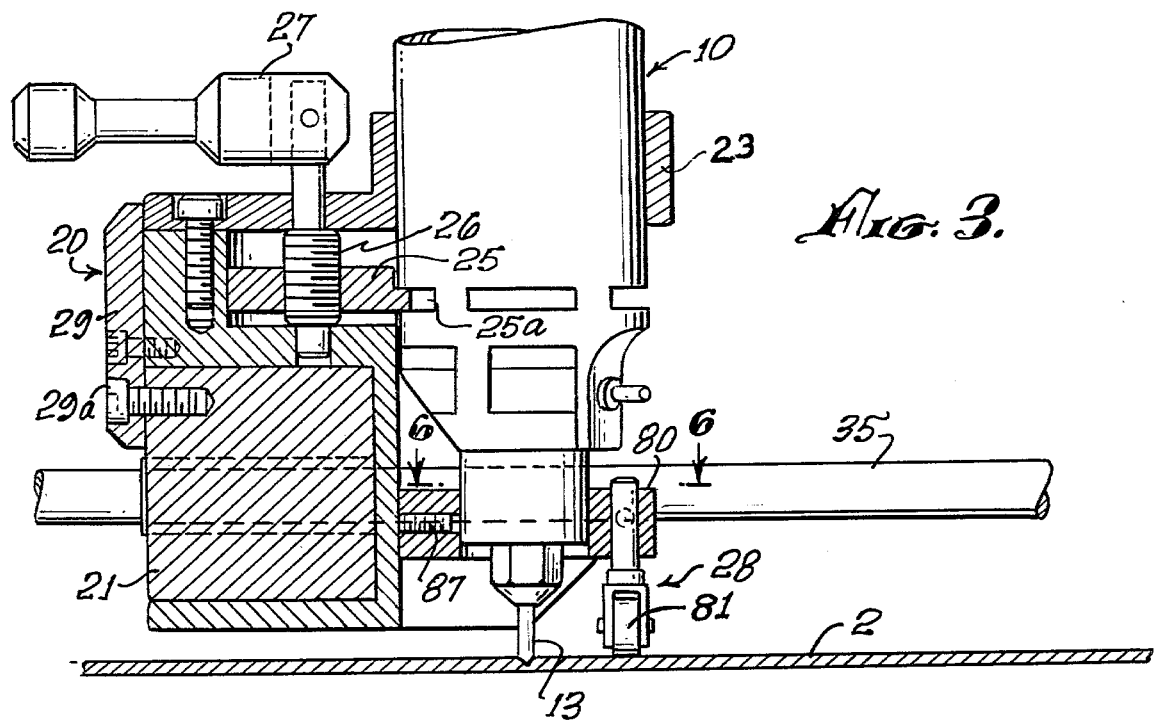
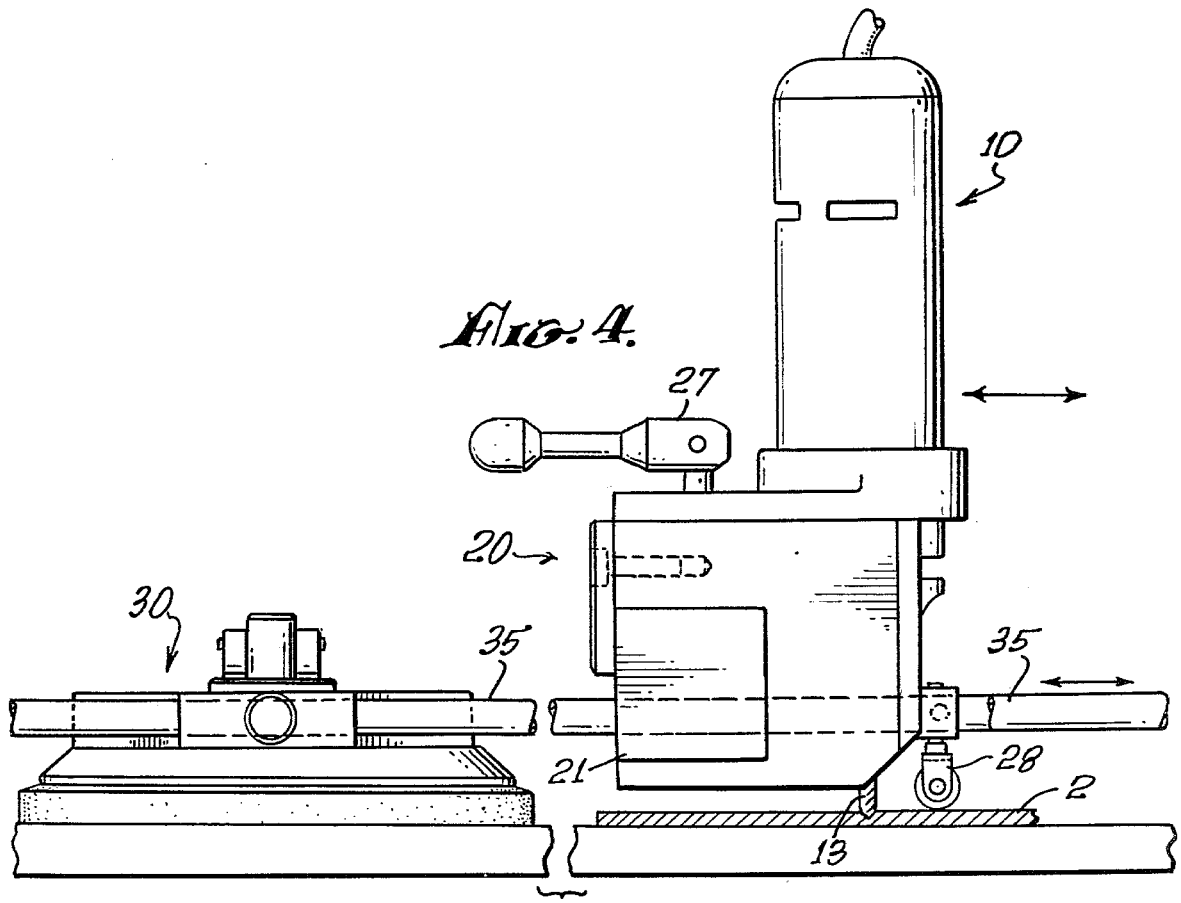

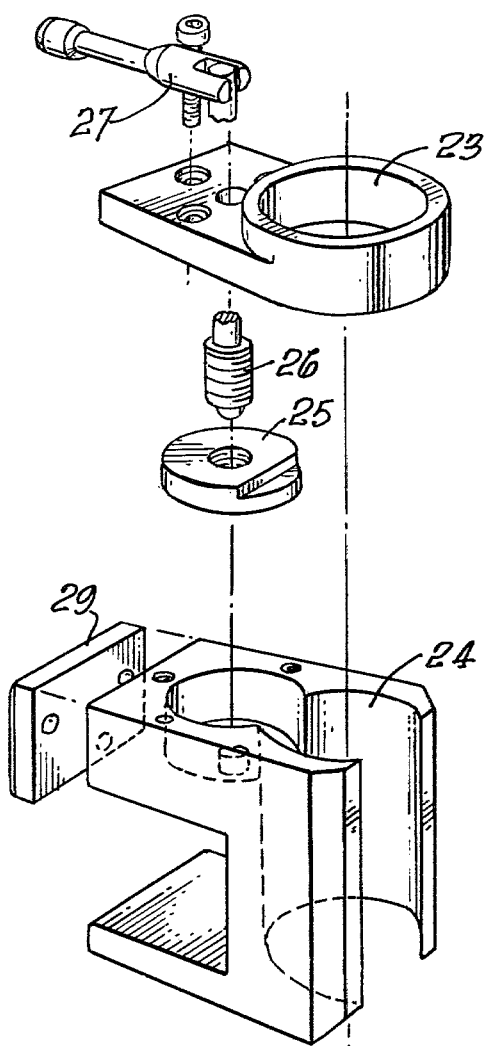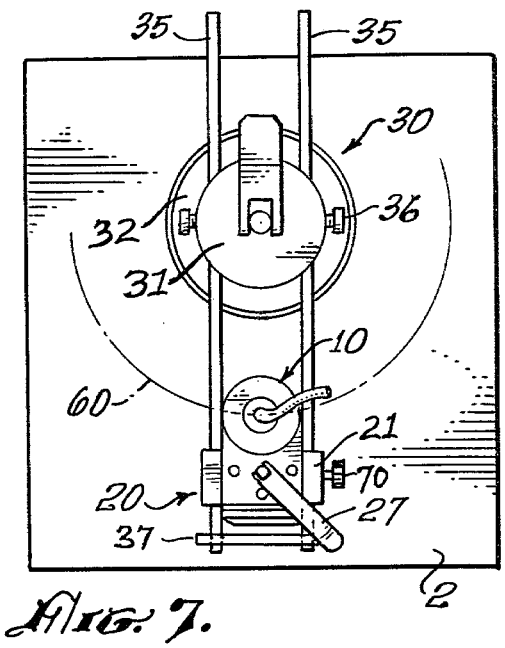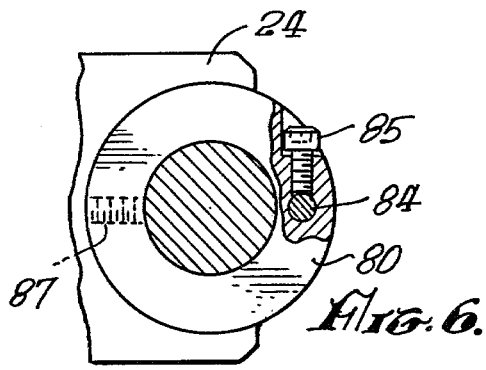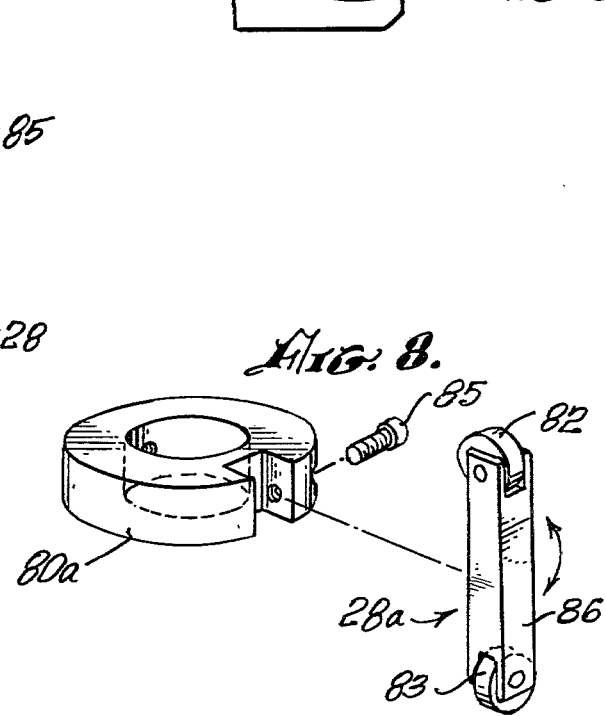

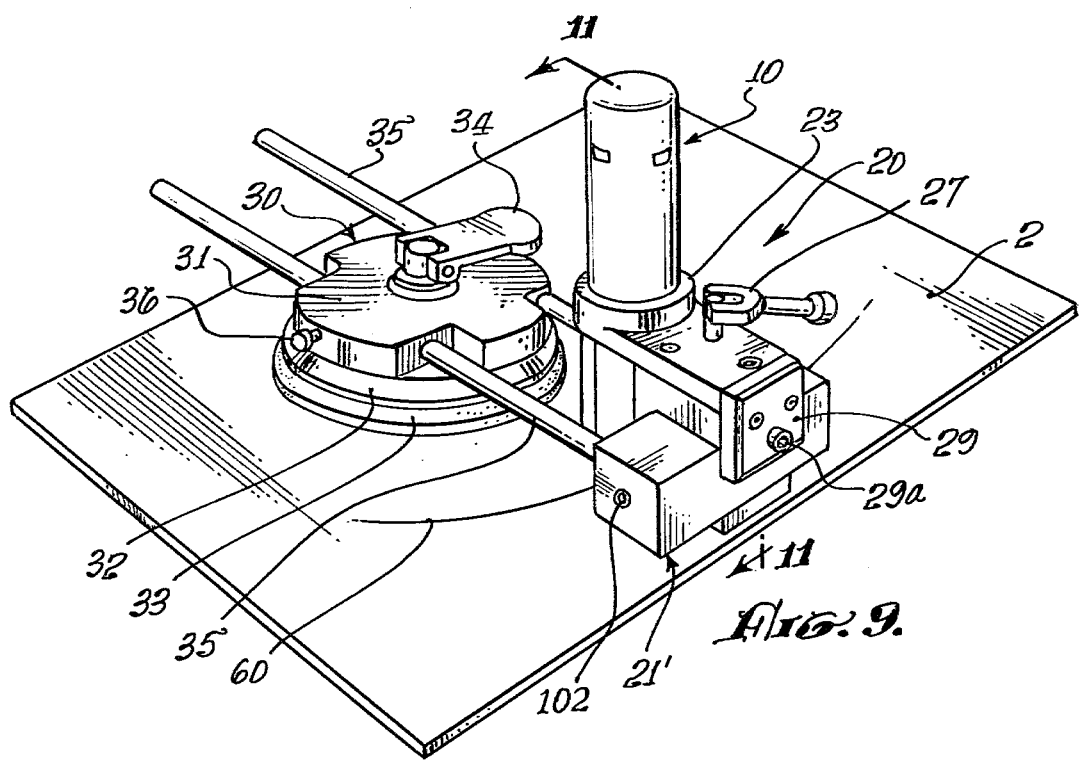
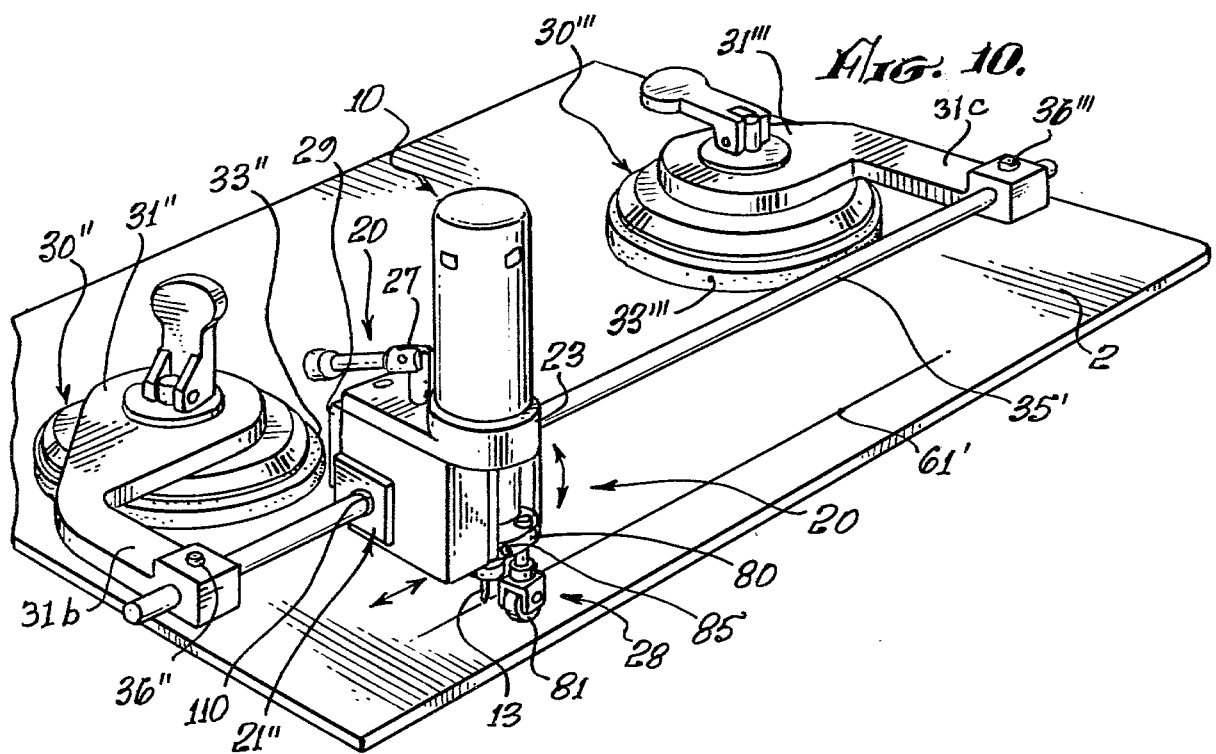

ROUTER GUIDE APPARATUS FOR CUTTING PRINTING PLATES

REFERENCE TO RELATED APPLICATION

This is a continuation-in-part of my prior application Ser. No. 016,361 filed March 1, 1979, now abandoned.

BACKGROUND

1. Field of Invention

Metal printing plates used in fine arts such as etching and engraving must often be cut to contours which include combinations of straight lines and arcs of circles. The plates are usually of sheet zinc or copper about 1.5 mm thick. In prior practice the plates are usually cut to shape with a sheet metal shear and a bandsaw. In unpracticed hands such machines are somewhat hazardous and have been found to create difficulties with insurance in art schools; they are also heavy and bulky.

There is hence a need for a safer and more portable apparatus to cut the plates to shape. A small-diameter router bit will safely make a non-distorting cut through a printing plate in a few passes, but requires a safe and versatile guiding system.

2. Prior Art

The following U.S. Pat. Nos. are the closest prior art of which I am aware:

(a) Chapman 881,899 shows a glass cutter on a telescoping arm rotatable about a central mount held to the work with a suction disc.

(b) Pederson et al 2,943,655 shows a router guide for cutting grooves in wood parallel to other grooves, or in arcs about a recess in the work.

(c) Cherry et al 3,858,630 shows a woodworking machine with a router and a templet tracer at opposite ends of a pair of rods slidable through a pivoted central support.

(d) Killian 2,589,554 shows a guide for a portable power circular saw, which slides along two parallel rods.

(e) Balcombe 4,031,931 shows a mortising machine in which a router slides along parallel rods.

(f) Lowry et al 3,421,411 shows a follower arm to limit the depth of cut, in a weld-trimming device.

Of the above references, (a)–(c) were found in a preliminary search, and (a), (d), (e), and (f) were applied by the Examiner to claims in the prior application referred to above.

BRIEF SUMMARY

A small commercial router head is supported in a mounting block which is attachable to radius rods swingable about a center head for cutting in arcuate paths, or alternatively attachable to means that slide along a linear guide rod means for cutting in a linear path. The center head preferably is held to the workpiece with a suction cup. The linear rod guide means is supported by its ends above the workpiece by heads of generally similar construction, also held to the work with suction cups.

In one form of the invention a pair of similar center heads is provided having suction-cup bases and rotatable top portions. Each top portion has a pair of spaced parallel openings through which guide rods may pass and be locked in place. To make arcuate cuts, only one of the heads is used, secured suitably to a portion of the workpiece by its suction cup or disc over the center of the arc to be cut. A pair of guide rods is passed through the holes in the top portion of the head, and one or more of the rods (here acting as radius rods) clamped in place by a suitable set screw or like means. The mounting block, carrying the router head, is then slipped onto the rods and clamped at the desired radius. The free ends of the rods are preferably held separated at the correct spacing by a suitable spacer bar. The router head may then be moved manually along an arc of predetermined radius about the center of the pivoted center head.

A follower arm is provided on the router mounting block, preferably with a roller riding on the surface of the workpiece with its axis oriented parallel to the guide rods. A suitable screw or other means adjusts the vertical relation between the router head and the roller to adjust the depth of cut. As the router head is moved manually along the desired arc, a light cut is taken first, then a heavier one, and so on until the plate is cut through.

To make straight-line cuts, a second center head is used, so that there is a head at each end portion of the guide rods, fixing them in place. If required, longer rods may be substituted for those used in making arcuate cuts. The router in its mounting block is then slid manually along the guide rods between the two heads. The follower arm roller is still the reference for the depth of cut, which is controlled as before; now, however, the axis of the roller is set perpendicular to the rods.

It is preferable, though not mandatory, that both the heads be of the same rotatable type that is used in arc cutting, because this permits making small adjustments in the position and direction of the straight line to be cut by moving only one or the other head, permitting the other to rotate slightly.

DETAILED DESCRIPTION

In the drawing:

FIG. 1 is a perspective view of one form of the apparatus set up for an arcuate cut;

FIG. 2 is a perspective view of the same form of the apparatus set up for a linear cut;

FIG. 3 is a section on line 3—3 of FIG. 1;

FIG. 4 is a section on line 4—4 of FIG. 2;

FIG. 5 is an exploded view of a router mounting block;

FIG. 6 is a section on line 6—6 of FIG. 5;

FIG. 7 is a top view of the apparatus of FIG. 1;

FIG. 8 is a detail of a modified follower arm;

FIG. 9 is a perspective view of another, preferred form of the invention for making an arcuate cut;

FIG. 10 is a perspective of the preferred form for making a linear cut;

Figure 11:
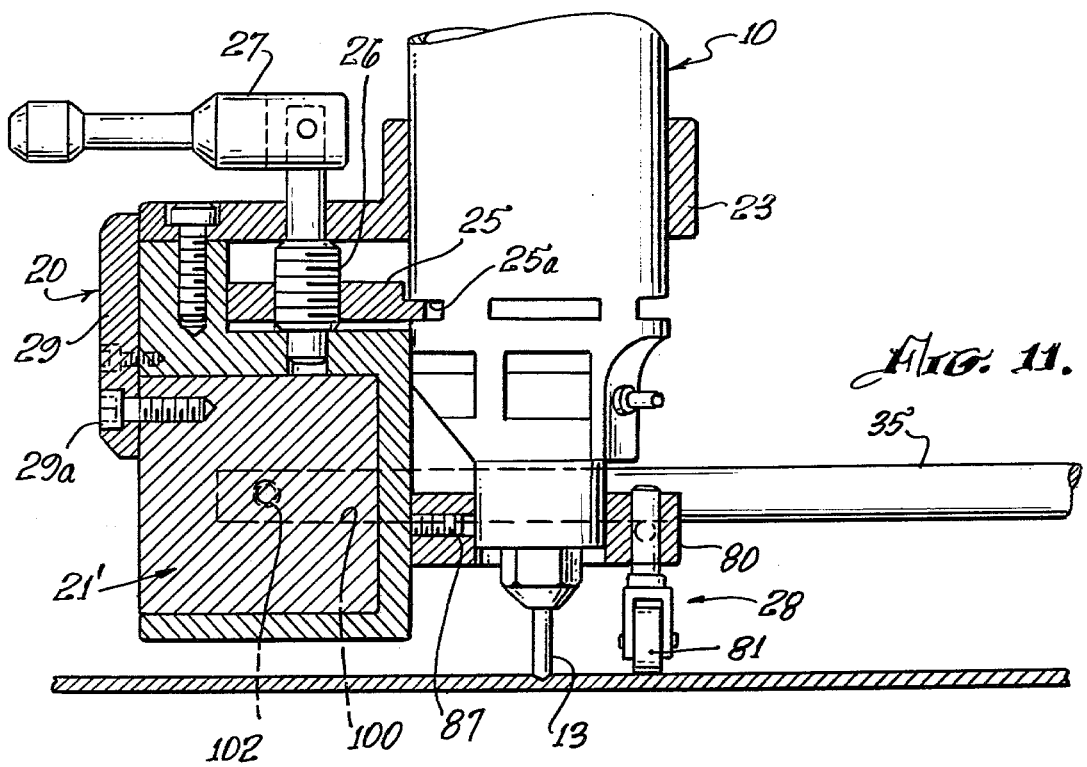
FIG. 11 is a section on 11—11 of FIG. 9.

A system will first be described with particular reference to cutting arcs of circles, FIGS. 1, 3, and 7. Referring first to FIG. 1, a router head indicated generally at 20 is part of the setup for guiding the router along an arcuate cut line 60 in a workpiece 2. The workpiece is typically a piece of zinc printing plate stock about 1.5 mm thick. Router head 10 preferably faces inward toward the center of the arc line 60 to minimize limitations on the shortest radius at which it can operate. Router head 10 may be a commercial unit with external portions of its case suitably machined, if required, to fit into the mounting block 20, and does not form a part of the invention.

Mounting block 20 may include a bar-like cross-member 21, to which the other elements are attached. The whole router sub-assembly can swing about a center head indicated generally at 30, to which it is connected by a radius arm. FIGS. 1, 3, and 7. This arm may preferably take the form of a pair of spaced parallel horizontal rods or radius rods or guide rods 35, 34 which pass through holes in the top portion 31 of center head 30.

Center head 30 has a base portion 32 provided preferably with a suction cup or disc 33 by which it can be secured removably to the workpiece 2 or to a bench top or other work surface. These elements may be of known construction, with a suitable handle or lever 34 on top disposed to pull upward the center of the rubber, or like, disc 33 to create a partial vacuum underneath. The top portion 31 of center head 30 is pivoted by suitable means, not shown, for free rotation about a vertical axis.

The radius rods or guide rods 35, 35, passing through holes in the top portion 31 of head 30, can thus swing in the horizontal plane. The rods may be clamped or locked at convenient positions in the holes by thumb screws 36 or other suitable means, FIGS. 1 and 7. The radius of arc 60 may be adjusted by sliding the mounting block 20 along the rods 35, 35 and locking it in place by a suitable means, such as thumb screw 70. One of the openings in member 21 through which rods 35 pass, is preferably made open at one side, or C-shaped, as indicated at 50, to prevent binding. The free ends of rods 35, 35 are held at the proper spacing by a suitable removable spacer 37.

The mounting block 20 is shown in more detail in FIGS. 3 and 5. A portion 22 of block 20 fits over the cross-member 21 and may be held in place with a suitable back plate 29 and suitable screws. Block 20 further includes router head retaining portions 23, 24. These are ring-like enclosure portions into which the body of router head 10 fits so that it can slide up and down a short way to permit adjustment of the depth of cut. Router head 10 itself may be a small commercial unit, such as is sold under the trade name "Dremel", consisting of a high-speed electric motor in a generally cylindrical housing and having a chuck to hold a router bit 13. See FIG. 3. To control and adjust the depth of cut, a lug 25 is provided which is movable linearly up and down as by a suitable screw 26, turned by a handle 27. Lug 25 engages a suitable opening or other element on the housing of router head 10, as at 25a, to raise and lower the router head 10. In FIG. 3 element 25a is shown as a ventilating slot.

A work follower arm 28, FIGS. 3, 5, and 8, is attached to the mounting block 20 and is provided preferably with a roller or the like that rides on the surface of workpiece 2 to establish a reference plane for the depth of cut. The depth of cut is set by adjusting the vertical position of the router head and its bit 13 by turning handle 27. In operation, a light cut is usually taken first, then the depth increased and the cut repeated, and so on until the bit 13 has cut clear through the workpiece 2. Five or six passes is typical.

Refer now to FIGS. 2 and 4, showing a setup for cutting straight lines. The same router head in the same mounting block 20 is used, the operator sliding the block manually along the rods 35 to make bit 13 traverse the desired line of cut 61 (FIG. 2); the locking screw 70 (FIG. 1) is loosened. The spacer 37 has been removed in the linear setup of FIG. 2, and a second center head 30' installed, so that both ends of the guide rods 35, 35 are now fixed with relation to the work surface. The workpiece 2 itself may be kept from slipping by means of any suitable holding means, not shown, such as toggle clamps. Advantageously the second center head 30' may be similar to the first head 30. When both heads thus have rotatable top portions 31, 31', it facilitates adjustment of the position of guide rods 35, 35 on the work surface, since one of the heads can be moved at a time, leaving the other in place.

The follower arm 28, FIG. 5, is used in the same manner in making either arcuate or linear cuts. However, the axis of the roller 81 must be perpendicular to the direction of the cut line 60 (FIG. 1) or 61 (FIG. 2); hence, when changing between the arcuate and the linear setups, the stem portion 84 of the follower arm 28 must be turned through 90 degrees. In FIG. 5, stem 84 fits in a hole in a ring-like member 80 which, in turn, fits up inside the router-retaining element 24. Stem 84 may simply be turned in the hole, being clamped or locked by a suitable set screw or the like 85. The ring-like member 80 is held in place as by a screw 87. The sectional detail of FIG. 6 shows the relationship of these parts assembled.

FIG. 8 shows a modification of the follower arm. Here, the modified arm 28a has a rectangular cross-section and rollers 82, 83 at each end, oriented perpendicularly to each other. To convert from the arcuate to the linear setup, the retaining screw 85 is loosened and the arm merely slipped out of the slot in ring 80a and turned upside down. Alternatively, the shank of the modified arm 28a may have a square section and a roller at only one end, being slipped out of the slot in ring 80a and then replaced in the desired orientation.

Guide rods 35, 35 may be lengths of commercial steel shafting about 10 mm in diameter. Preferably, two pairs of rods are supplied with the apparatus, a short pair for arc cutting and a longer pair for use in cutting straight lines.

Preferred Form

Figure 12:
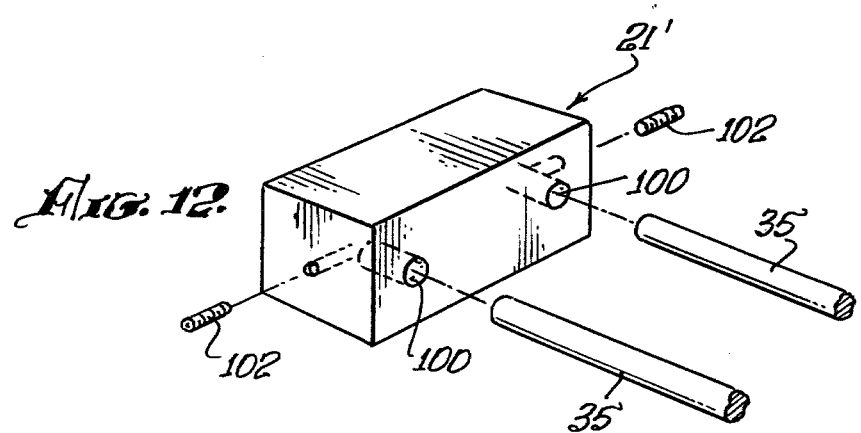
FIG. 12 is a detail of a portion of FIG. 9.

A preferred embodiment is shown in FIGS. 9–13. FIG. 9 shows in perspective a preferred system for cutting arcs, such as arc 60. Router head 10 in a mounting block assembly 20 is preferably of the same construction as in FIG. 1. It fits detachably over a mounting bar 21', preferably of square cross-section, and is held in place by a screw 29a or other suitable means. See also FIG. 11. Unlike the structure of FIG. 1, the bar 21' in FIG. 9 is permanently fixed to the ends of the pair of radius rods 35, 35 instead of being slidable therealong. FIGS. 11 and 12 show rods 35 fitting in holes 100, 100 and held by set screws 102, 102.

In FIG. 9 the rods 35, 35 slide in the holes in the center head 30 to adjust the radius of the arc to be cut. They may be locked by thumb screws as at 36. The center head 30 may be made the same as head 30 of FIG. 1.

Figure 13:
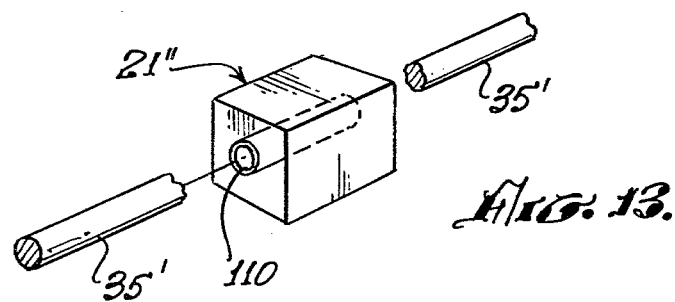
FIG. 13 is a detail of a portion of FIG. 10.

Straight-line cuts are made, in this preferred form of the invention, with the linear guide means of FIG. 10. A second mounting bar 21" has the same external cross-section as bar 21; the router head assembly 10, 20 is clamped over it in the same way as in FIG. 9. The linear mounting bar 21" has a single axial through-hole into which is fitted a bushing 110 which can slide along and rotate about a single guide bar 25'. FIG. 13 shows a detail. The bushing 110 is preferably of a type such as is sold commercially under the trade name "ball bushing".

Similar devices are sold by other manufacturers under names such as "linear ball bearing". Rotational displacement of the router assembly is of course prevented by the work follower arm 28 with roller 81 contacting the work, which thus controls and limits the depth of the cut taken by router bit 13. Particularly when there is a ball bushing at 110, this construction provides more freedom of sliding movement and better control of the depth of cut than the two-rod form of FIG. 2.

In FIG. 10 the heads 30", 30''' differ from the head 30 of FIG. 9 and heads 30, 30' of FIG. 2 in that their top portions have offset extensions 31b, 31c. These permit the suction cup portions or bases 33", 33''' to be fastened directly to the workpiece 2 itself while permitting the router to cut substantially all the way to the edge of the workpiece. Except for the offset extensions, these heads are preferably made the same as the other heads shown. It is convenient for the tops 31", 31''' to be rotatable because this enables one head to be moved at a time for adjusting the position of the cut.

It will be seen that in this preferred form of the invention the follower arm 28 need not be readjusted when changing between arcuate cuts and linear cuts. For both kinds of operation the correct orientation is with the axis of the roller 81 parallel to the long axis of the mounting bar 21' or 21". FIGS. 10–11.

I claim:

1. Router apparatus for cutting printing plates to outlines which include arcuate and linear segments, comprising:
   a router head with a router bit;
   a mounting block having retaining means retaining said router head and having vertical adjusting means to adjust the depth of cut of said bit;
   a mounting bar;
   a rod;
   means in said mounting block to fasten it detachably to a said mounting bar, said router head, mounting block, and mounting bar forming an assembly,
   said mounting bar having at least one opening fittable slidably over said rod;
   a first center head comprising a suction-cup base and a first top portion mounted rotatably thereon for substantially 360° pivotal movement and having an opening fittable over a said rod, and means to clamp said rod therein to prevent sliding;
   at least one second center head comprising a suction-cup base and a second top portion having a second opening fittable over a said rod,
   a said assembly being attachable to a said rod acting as a radius rod on a said first center head to cut a said arcuate segment, and
   a said assembly being slidable along a said rod held in a said second opening in a said second center head, to cut a said linear segment.

2. Apparatus as in claim 1, wherein there are a first and a second of said mounting bars,
   said first mounting bar having a pair of spaced parallel transverse openings fittable over a pair of spaced parallel said rods, and
   said first top portion of said first center head having similarly-spaced parallel openings to receive and hold said rods,
   said mounting block being attachable to said first mounting bar,
   said rods acting as radius rods to constrain said router when attached to said block to motion in an arcuate path about said first center head to cut a said arcuate segment.

3. Apparatus as in claim 2 wherein:
   said second mounting bar has a lengthwise second mounting bar opening fittable over a said rod and slidable therealong,
   said mounting block being attachable to said mounting bar, and wherein
   said second center heads are two in number, each adapted to hold one end portion of said rod,
   said rod acting as a linear guide rod to constrain said router to motion in a linear path parallel thereto to cut a said linear segment.

4. Apparatus as in claim 3, wherein said second mounting bar opening is lined with a bushing which permits both linear and rotary motion.

5. Apparatus as in claim 4, wherein said bushing is lined with rollable balls in the manner of a linear ball bearing.

6. Apparatus as in claim 4, further comprising:
   a work follower arm on a said mounting block and having contact means adapted to ride along the surface of a said printing plate to provide a vertical reference for the depth of cut of said router bit,
   freedom of said bushing to rotate about said guide rod serving to permit said contact means to remain in contact with said surface;
   and means to adjust the vertical position of said contact means to adjust said depth of cut.

7. Apparatus as in claim 3, wherein:
   said top portions of said second center heads have offset arm portions whose end portions are adapted to receive and hold the said end portions of said rod,
   said heads being thereby positionable on a printing plate with said end portions of said arm portions extending beyond the edges of said plate, to permit said router bit to cut substantially to said edges.

* * * * *